Patented Sept. 7, 1937

2,092,460

UNITED STATES PATENT OFFICE 2,092,460

INSECTICIDE AND FUNGICIDE SPREADER

Frank Floyd Lindstaedt, Oakland, Calif., assignor to Hercules Glue Company, Ltd., San Francisco, Calif., a corporation of California No Drawing. Application June 7, 1928, Serial No. 283,738

19 Claims. (Cl. 167—42)

My invention relates to what is commercially known as spreader and adhesives for use with insecticidal or fungicidal or other sprays, especially to liquid sprays, but also applied to dust spray.

It is my chief object in general to produce an improved spreader for use with any spray but especially intended as an insecticide or fungicide or ovicide, and in addition, a spreader and adhesive which is less expensive than spreaders now commonly in use for any spray purpose, and which can be used in lesser amounts, to accomplish superior results.

My invention comprises the improved spreader, compounded substantially of the materials or their equivalents, in substantially the proportions, or between the limits, hereinafter set forth, and especially defined by the claims.

The value of casein as a spreader for such purposes as indicated above has long been recognized, but casein is comparatively expensive, costing some 16 cents per pound. As large quantities of this spreader are used in spraying an orchard, this becomes an item of considerable expense in the aggregate. While I employ casein as the active ingredient of my spreader, I have introduced additional elements which so modify the colloidal film produced that it will hold larger amounts of the active and toxic ingredients of the spray, and permit a smaller amount of the casein to do a larger and more efficient amount of work; that is to say, to permit less casein to be used in proportion to the other ingredients of the spreader, and to render that which is included more active in the deposition, adherence and holding of the lead arsenate or other active insecticide or fungicide ingredient used.

As it is commonly the practice to mix an oil with the spray and the spreader, the oil being particularly intended as an ovicide and larvicide, it must be kept in mind, in the following discussion, that certain forms of my spreader are adapted for use with the spray material without the added oil, and that, if oil is added, the composition of the spreader will be correspondingly altered, but the spreader is nevertheless essentially the same.

Assuming that the spreader is to be used with the spray medium, as lead arsenate, and without the admixture of oil therewith, I have found the following spreader to be most generally satisfactory:

|  | Per cent |
|---|---|
| Powdered rosin | 5 |
| Casein | 16 |
| Calcium hydrate (Ca(OH)$_2$) | 77 |
| Soda ash | 02 |
|  | 100 |

This is employed by mixing into the spray tank from one to two pounds of the above mixture to each 200 gallons. The amount used depends on the object to be accomplished in the use of the spray.

As has been stated, the casein, which is employed for its high protein content, is the active ingredient in the above spreader, so far as concerns its distribution of the insecticide. It is also the expensive ingredient, and the reason for the cheapness of this spreader, as compared with former spreaders, such as calcium caseinate, wherein the casein content was perhaps 25% of the whole, may be appreciated, when the 16% of casein in the above formula is compared with the 25% of other formulas. Also, calcium caseinate was commonly employed in the proportion of two pounds to 200 gallons, for lead arsenate sprays, so that where the apparent saving in the casein is the difference between $4.00, the cost of 25 pounds of casein, and $2.56, the cost of 16 pounds of casein, or $1.44, actually, due to the difference in the proportion of spreader used per gallon of spray, the saving is $2.88 for every 100 pounds of the spreader, at current prices of casein.

The rosin acts as a deflocculator to disperse the casein in the colloidal solution. Instead of the powdered rosin, I may substitute an equal amount of dextrine, or a mixture of the two. The function of the rosin or the dextrine is to increase the amount of arsenic and uniformity of the arsenic in the film, where lead arsenate is the spray material employed. It will, in fact, increase the uniformity of any spray film, and cause a more even distribution of the toxic substance over the surface to be sprayed.

With spreaders such as calcium caseinate, heretofore considered superior to most, if not all other spreaders, there was a marked difference in the quantity of arsenate or like insecticide on the upper and lower halves of the fruit. Test discs cut from an apple just above the equator and also from just below, revealed that the upper half had less insecticide than it should have had for the best protection of the apple, yet no more could be added, due to the tendency of the insecticide and especially arsenate of lead to slip down through the film formed by the spreader past the equator, and much of it to drip from the fruit and leaf or bark of the tree.

My improved spreader makes possible the formation of a heavier bodied film of insecticide, and in addition, causes its distribution more evenly over the whole of the surface or fruit sprayed. As compared with calcium caseinate taken as 100%, my spreader with dextrine largely replacing the rosin, has been found to add 19% more insecticide on the lower half of the apple, and 30% more on the upper half. With rosin alone, 38% more insecticide is deposited on the lower half, and 61% more on the upper half. The advantage is even more marked when compared to a commercial blood albumen used as a liquid spreader.

The significance of these results, obtained by actual orchard and laboratory tests, is that the improved spreader permits the addition of a heavier bodied film, and makes this film more uniform throughout, thereby obtaining a maximum of protection with a minimum of active spray material used. Not only is this true, but the cost of the spreader itself is lessened.

The calcium hydrate is employed as a filler, or vehicle, to aid in the dispersion of the casein and rosin. I have not found a practicable substitute for this, inasmuch as the calcium hydrate is probably as cheap a substance as can be found, which would be suitable for the purpose. The employment of such hydrates as sodium, potassium, or ammonium hydrate is not feasible when rosin is employed, as there would be formed by reaction with such hydrates a rosin soft soap. Sufficient of the calcium hydrate is employed to prevent the formation of such a soft soap.

I have found that a part or all of the casein may be replaced by other forms of protein, either of animal or of vegetable origin, for example, soya bean, peanut or garvanza bean or castor bean flour, dried defatted beef, or horse meat, or like meat products, ground, or milk or blood albumen; or powdered milk, may be substituted, in part or wholly, for the casein. Of course, it must be kept in mind, in making such substitutions, that it is the protein content which renders the spreader effective, and the substitution must be varied and made chiefly on the basis of the protein content of the material which replaces the casein; for example, where casein is 97% protein, approximately, horse meat may be only 75% protein, and therefore, a greater bulk of horse meat will be required than of casein. Generally speaking, therefore, I employ a proteid as a means of producing a colloidal film.

I have indicated that from 5% to 20% of casein should be employed; based on actual protein content the protein content can be said to range from as low as 4% upwards to 20% since the casein is not pure protein. In addition, a relative relationship of protein to lime or alkali earth material can be expressed; thus in the preferred example the casein is 17.2% of the total lime-casein content, or about 17.0% of the total lime-protein content, less than 20% of the total quantity of protein and lime calculated on the basis of calcium hydroxide.

The soda ash ($Na_2CO_3$) is desirable in small quantities in the spreader, inasmuch as it acts as an accelerator to disperse the casein quickly in the spray. It might be dispensed with, however, and the dispersion of the casein left to the rosin or dextrine, and lime. If desired, there may be substituted for the soda ash sodium bicarbonate ($NaHCO_3$), or trisodium phosphate ($Na_3PO_4$).

If no oil is included in the spray mixture, it is advantageous to use a higher percentage of rosin than that given above, as much as 7 or 8 per cent or more. In such event, the proportion of calcium hydrate may be cut down. There is no lower limit to the amount of rosin which may be used to advantage, as even 1% of rosin in the whole spreader has been found to increase the uniformity of the arsenic film. When arsenate of lead and oil is used in the spray however, there should be used not to exceed 5% of the rosin, as higher percentages have been found to interfere with proper spreading of the lead and causes spots of lead residue to form on the apple.

The proportion of casein stated, namely, 16% has been found to be a satisfactory one for general purposes. As little as 10% of the casein might be employed, or even less, if the spreader is fortified with other proteins, while more than 16%, say as much as 25%, might be employed. The advantage of the spreader as to cheapness is not apparent in such case, though its action in rendering the arsenic film more uniform is just as pronounced visibly, if not more so, but chemical test only shows the efficiency of a spreader to retain more active spray ingredients.

As has been stated, the calcium hydrate is a filler and dispersion agent and its proportions will vary as the proportions of the other ingredients vary. If more rosin or dextrine or both or casein is added, the percentage of calcium hydrate drops, and vice versa.

The spreader, in the form given in the above formula, is a dry powder, and in order to prevent its dusting and dispersion in the air, especially the calcium hydrate, when not used as a dust spray, some 5 to 10 percent of hydrocarbon oil may be mixed with the spreader. This will also protect the calcium hydrate from carbonization. This oil will not be detrimental to the spreader, and may even to some extent add to its efficiency as an ovicide although the amount of oil is insufficient per se to have such an effect.

This spreader has been found to improve the spreading and adhering properties of every spray mixture with which it has been employed to date. It improves the action of Bordeaux mixture, of lead arsenate, calcium arsenate, or any arsenic compounds and of lime sulphur, sulphur alone, Paris green, and oil, or any spray material, or any combination of the spray materials used for spraying and generally makes otherwise incompatible mixtures compatible as a combination spray. When used with a nicotine spray, such as nicotine sulphate, or nicotine alkaloid, not only does it improve the spreading qualities and the uniformity of the film left by such spray material, but it has been found to hold the volatile nicotine and to retard its evaporation, for long periods, usually three days and longer, as compared with three hours, the normal effective period of nicotine.

This invention is concerned with a reduction in the protein content employed, resulting in an increase in the lime to protein ratio so that this ratio is in excess of 4; that is, over four times as much lime as effective protein is included. Casein is not a pure protein so the actual protein content will be slightly less than the permissible casein limits indicated herein of from 5% to 20%.

What I claim as my invention is:

1. A powder, for addition to spray solutions to act as a spreader, including rosin, and sufficient calcium hydrate to prevent formation of a rosin soft soap.

2. A powder, for addition to spray solutions to act as a spreader, including rosin and casein, with lime as a filler and dispersing agent.

3. A powder, for addition to spray solutions to act as a spreader, including rosin and casein as the active dispersing ingredients, soda ash to accelerate the dispersion, and calcium hydrate as a filler and dispersing agent.

4. A powder, for addition to spray solutions to act as a spreader, consisting essentially of a dry powdered mixture containing a protein colloid, as casein, a dispersing agent selected from the group consisting of rosin and dextrine, and a filler.

5. A powder, for addition to spray solutions to act as a spreader, including any protein colloid, as casein, and a dispersing agent selected from the group consisting of rosin and dextrine, and an alkali accelerating agent selected from the group consisting of soda ash, sodium bicarbonate and trisodium phosphate and calcium hydrate, as a filler and dispersing agent.

6. A powder, for addition to spray solutions to act as a spreader, consisting essentially of a dry powdered mixture containing from a trace to 15% of a substance selected from the group consisting of rosin and dextrine, casein from 5 to 20%, and hydrate of lime as a filler and dispersing agent.

7. A powder, for addition to spray solutions to act as a spreader, consisting essentially of a dry powdered mixture containing from 5 to 20% of casein or its protein equivalent, a dispersing agent selected from the group consisting of rosin and dextrine up to 15%, and hydrate of lime as a filler and dispersing agent.

8. A powder, for addition to spray solutions to act as a spreader, including from 5 to 20% of casein or its protein equivalent, a dispersing agent selected from the group consisting of rosin and dextrine up to 15%, up to 2% soda ash, and hydrate of lime to make 100 per cent.

9. A powder, for addition to spray solutions to act as a spreader, for use with oil including from 5 to 20% of casein or its protein equivalent, a dispersing agent selected from the group consisting of rosin and dextrine not to exceed 15%, and hydrate of lime to make 100 per cent.

10. A powder, for addition to insecticidal and fungicidal or to any sprays to act as a spreader, including the materials in the proportions approximately and substantially as follows: a dispersing agent selected from the group consisting of powdered rosin and dextrine, 5%; casein or its protein equivalent, 16%; soda ash, 2%; calcium hydrate, 77%.

11. A spreader for sprays comprising a protein and lime, the quantity of protein being less than 20% of the total quantity of protein and lime calculated on the basis of calcium hydroxide.

12. A spreader for sprays comprising a protein and lime, the quantity of protein being less than 20% and more than 5% of the total quantity of protein and lime calculated on the basis of calcium hydroxide.

13. A spreader for sprays comprising lime, casein and a deflocculator in substantially the following proportion by weight: casein, 5 to 20%, deflocculator, trace to 15%, lime (on the basis of hydrated lime), substantially constituting the balance, the ratio of lime to casein being greater than 4 to 1.

14. A spreader for sprays comprising a mixture of lime and casein wherein the casein content is 20% or less and wherein the excess lime content is more than three times the content of combined lime and casein.

15. A spreader for sprays including casein, sufficient lime to form calcium caseinate therewith, and an excess of a dispersing material unreactive with respect to said calcium caseinate and present in an amount three or more times the weight of said calcium caseinate.

16. A spreader for sprays including casein and lime and having at least four times as much lime, on a calcium hydroxide basis, as casein.

17. A spreader for sprays including casein and lime and having at least four times as much lime, on a calcium hydroxide basis, as casein and including an alkali accelerating agent.

18. A powder for addition to an aqueous spray as a spreader therefor, said powder including lime and casein and having from 5% to 20% casein and at least four times the weight of casein as lime on a calcium hydroxide basis.

19. A powder for addition to an aqueous spray as a spreader therefor, said powder including lime and casein and having approximately ten times as much lime as casein on a weight basis.

FRANK FLOYD LINDSTAEDT.